United States Patent
Marmaros

(10) Patent No.: US 7,853,606 B1
(45) Date of Patent: Dec. 14, 2010

(54) ALTERNATE METHODS OF DISPLAYING SEARCH RESULTS

(75) Inventor: David Marmaros, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 956 days.

(21) Appl. No.: 10/940,209

(22) Filed: Sep. 14, 2004

(51) Int. Cl.
G06F 7/00 (2006.01)

(52) U.S. Cl. ............................ 707/769; 707/802

(58) Field of Classification Search .............. None
See application file for complete search history.

(56) References Cited

U.S. PATENT DOCUMENTS

| | | | |
|---|---|---|---|
| 5,388,257 A | 2/1995 | Bauer | |
| 5,701,469 A * | 12/1997 | Brandli et al. ................ | 1/1 |
| 5,701,474 A | 12/1997 | Harper | |
| 5,758,331 A | 5/1998 | Johnson | |
| 5,813,007 A * | 9/1998 | Nielsen ...................... | 707/10 |
| 5,859,639 A | 1/1999 | Ebrahim | |
| 5,867,729 A | 2/1999 | Swonk | |
| 5,886,694 A | 3/1999 | Breinberg et al. | |
| 6,006,222 A | 12/1999 | Culliss | |
| 6,009,459 A | 12/1999 | Belfiore et al. | |
| 6,014,665 A | 1/2000 | Culliss | |
| 6,078,916 A | 6/2000 | Culliss | |
| 6,169,979 B1 | 1/2001 | Johnson | |
| 6,182,068 B1 | 1/2001 | Culliss | |
| 6,272,489 B1 * | 8/2001 | Rauch et al. ................. | 707/4 |
| 6,380,983 B1 | 4/2002 | Miyazaki et al. | |
| 6,384,840 B1 | 5/2002 | Frank et al. | |
| 6,393,456 B1 * | 5/2002 | Ambler et al. ............ | 709/200 |
| 6,401,097 B1 * | 6/2002 | McCotter et al. .......... | 707/102 |
| 6,456,307 B1 | 9/2002 | Bates et al. | |
| 6,466,238 B1 * | 10/2002 | Berry et al. ................ | 715/847 |
| 6,484,156 B1 * | 11/2002 | Gupta et al. ............... | 707/802 |
| 6,484,162 B1 * | 11/2002 | Edlund et al. ................ | 707/3 |
| 6,581,056 B1 | 6/2003 | Rao | |
| 6,654,036 B1 | 11/2003 | Jones | |
| 6,711,565 B1 | 3/2004 | Subramaniam et al. | |

(Continued)

FOREIGN PATENT DOCUMENTS

WO  WO 01/55909  * 8/2001

OTHER PUBLICATIONS

Susan Dumais, Edward Cutrell, Ramen Sarin, Eric Horvitz, "Implicit Queries (IQ) for Contexualization", Microsoft Research, SIGIR '04 Jul. 25-29, 2004, Sheffield, South Yorkshire, UK, ACM 1-58113-881-4/04/ 0007.*

(Continued)

Primary Examiner—Tim T. Vo
Assistant Examiner—Hasanul Mobin
(74) Attorney, Agent, or Firm—Fenwick & West LLP

(57) ABSTRACT

Methods and systems for displaying search results are set forth. According to one embodiment, a method comprising identifying a user interface native to a client application, identifying a search query, receiving a search result set responsive to the search query from a search application, wherein the search result set comprises a first article identifier associated with a first article and a second article identifier associated with a second article, the first article native to the client application and the second article not native to the client application, and displaying the search result set in the user interface is set forth.

24 Claims, 6 Drawing Sheets

U.S. PATENT DOCUMENTS

| | | | |
|---|---|---|---|
| 6,718,334 | B1 | 4/2004 | Han |
| 6,725,244 | B1 | 4/2004 | Bonwick |
| 6,735,774 | B1 | 5/2004 | Krishnaswamy |
| 6,745,178 | B1 | 6/2004 | Emens et al. |
| 6,801,906 | B1 | 10/2004 | Bates et al. |
| 6,816,847 | B1 | 11/2004 | Toyama |
| 6,971,068 | B2 | 11/2005 | Bates et al. |
| 6,981,040 | B1 | 12/2005 | Konig et al. |
| 6,995,805 | B1 | 2/2006 | Park |
| 7,031,961 | B2 | 4/2006 | Pitkow et al. |
| 7,047,502 | B2 | 5/2006 | Petropoulos et al. |
| 7,082,428 | B1 | 7/2006 | Denny et al. |
| 7,146,573 | B2 | 12/2006 | Brown et al. |
| 7,149,974 | B2 | 12/2006 | Girgensohn et al. |
| 7,162,473 | B2 * | 1/2007 | Dumais et al. ............. 707/5 |
| 7,194,460 | B2 * | 3/2007 | Komamura ............... 707/4 |
| 7,225,187 | B2 | 5/2007 | Dumais et al. |
| 7,409,646 | B2 * | 8/2008 | VedBrat et al. ........... 715/815 |
| 2002/0019763 | A1 | 2/2002 | Linden et al. |
| 2002/0038299 | A1 | 3/2002 | Zernik et al. |
| 2002/0055919 | A1 | 5/2002 | Mikheev |
| 2002/0065841 | A1 | 5/2002 | Matsuda et al. |
| 2002/0107847 | A1 | 8/2002 | Johnson |
| 2002/0147704 | A1 * | 10/2002 | Borchers ................. 707/3 |
| 2003/0112278 | A1 | 6/2003 | Driskell |
| 2003/0135430 | A1 | 7/2003 | Ibbotson |
| 2003/0135490 | A1 | 7/2003 | Barrett et al. |
| 2003/0144996 | A1 * | 7/2003 | Moore, Jr. ............... 707/3 |
| 2003/0167266 | A1 | 9/2003 | Saldanha et al. |
| 2003/0217108 | A1 | 11/2003 | Karim |
| 2004/0003351 | A1 | 1/2004 | Sommerer et al. |
| 2004/0030741 | A1 * | 2/2004 | Wolton et al. ............ 709/202 |
| 2004/0098394 | A1 | 5/2004 | Merritt et al. |
| 2004/0143564 | A1 * | 7/2004 | Gross et al. .............. 707/1 |
| 2004/0143569 | A1 | 7/2004 | Gross et al. |
| 2004/0215607 | A1 | 10/2004 | Travis |
| 2004/0267730 | A1 | 12/2004 | Dumais et al. |
| 2005/0028108 | A1 | 2/2005 | Baudisch et al. |
| 2005/0050454 | A1 * | 3/2005 | Jennery et al. ........... 715/513 |
| 2005/0065958 | A1 * | 3/2005 | Dettinger et al. ......... 707/102 |
| 2005/0076019 | A1 | 4/2005 | Jackson et al. |
| 2005/0086254 | A1 | 4/2005 | Zou et al. |
| 2005/0108394 | A1 * | 5/2005 | Braun et al. ............. 709/225 |
| 2005/0108655 | A1 | 5/2005 | Andrea et al. |
| 2005/0131888 | A1 | 6/2005 | Tafoya et al. |
| 2005/0149496 | A1 | 7/2005 | Mukherjee et al. |
| 2005/0149498 | A1 | 7/2005 | Lawrence et al. |
| 2006/0036966 | A1 * | 2/2006 | Yevdayev ............... 715/779 |

OTHER PUBLICATIONS

Susan Dumais, Edward Cutrell, JJ Cadiz, Gavin Jancke, Ramen Sarin, Daniel C. Robbins "Stuff I've Seen: A System for Personal Information Retrieval and Re-Use", Microsoft Research, SIGIR '03 Jul. 28-Aug. 1, 2003, Toronto, Canada, ACM 1-58113-646-3/03/0007.*

Blake V. Miller, Associate File Extension with Shell Open command and Application, Google Search, http://www.codeproject.com/shell/cgfiletype.asp, Jun. 23, 2000.*

U.S. Appl. No. 10/749,440, filed Dec. 31, 2003, Badros et al.

80-20 Software—Products—80-20 One Search, http://www.80-20.com/product/tone-search/retriever.asp, printed Mar. 16, 2004.

"askSam™ Making Information Useful"; askSam,—Organize your information with askSam, http://www.asksam.com/brochure.asp, printed Mar. 15, 2004.

Alexa® Web Search—Toolbar Quick.Tour, http://pages.alexa.com/prod_serv/quicktour.html pp. 1-5, printed Mar. 16, 2004.

Barrett. R. et al., "How to Personalize the Web," IBM Research, http://www.almaden.ibm.com/cs/wbi/papers/chi97/wbipaper.html, pp. 1-13, printed Mar. 16, 2004.

Battelle. J., CNN.com "When geeks go camping,ideas hatch," http://www.cnn.com/2004/TECH/ptech/01/09/bus2.feat.geek.camp/index.html, pp. 1-3, printed Jan. 13, 2004.

Boyan, J., et al., 'A Machine Learning Architecture for Optimizing Web Search Engines; School of Computer Science. Carnegie Mellon University, May 10, 1996, pp. 1-8.

Bradenbaugh. F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30 printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-technologies,com/products/devonthink.php, printed Mar. 16, 2004.

dtSearch®—http://www.dtsearch.com/ printed Mar. 15, 2004.

Dumais. S., et al, "Stuff I've Seen: A System for Personal Information Retrieval and Re-Use," Microsoft Research, *SIGIR '03*, Jul. 28-Aug. 1, 2003, pp. 1-8.

Enfish, http://www.enfish.com printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www,acm.org/sigchi/chi96/proceedings/videos/Fertig/etf.htm, pp. 1-3, printed Mar. 16, 2004.

Geisler. G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e.., pp. 1-4, printed May 19, 2004.

Naraine, R., "Future of Search Will Make You Dizzy," Enterprise, May 20, 2004. http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*. Jan. 9-12, 2000.

Rhodes, B., et al., "Just-in-time information retrieval agents," *Systems Journal*. vol. 39, Nos. 3&4, 2000, pp. 685-704.

Rhodes, B., et al., "Remembrance Agent —A continuously running automated Information retrieval system," *The Proceedings of the First International Conference on the Practical Application of Intelligent Agents and Multi Agent Technology* (PAAM '98), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004. http://redherring.com/PrintArticle aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998. pp. 1-2.

WebWatcher Home Page, "Welcome to the WebWatcher Project." http//www-2.c.s.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www,.x1.com/, printed Mar. 15, 2004.

Zellweger, P. et al., "Fluid Links for Informed and Incremental Link Transitions," Proceedings of Hypertext'98, Pittsburgh. PA. Jun. 20-24, 1998, pp. 50-57.

Salahour, A., et al., "Desktop Rearrangement Based on Incoming Calls", IBM Technical Disclosure Bulletin, Jan. 1994, pp. 657-658, vol. 37, No. 01.

Wynblatt, M., et al., "Web Page Caricatures: Multimedia Summaries for WWW Documents," Proc. IEEE Int'l Conf. Multimedia Computing and Systems, Jun. 22-Jul. 1, 1998, pp. 194-199.

Archive of "Froogle," www.froogle.google.com, 1 page, [online] [Archived by http://archive.com on Mar. 30, 2004; Retrieved on Oct. 20, 2006] Retrieved from the Internet<URL:http://web.archive.org/web/20040330045133/froogle.google.com>.

Archive of "Google News," www.news.google.com, 5 pages, [online] [Archived by http://archive.com on Mar. 25, 2004; Retrieved on Oct. 20, 2006] Retrieved from the Internet<URL:http://web.archive.org/web/20040325173400/http://www.news.google.com>.

* cited by examiner

ALTERNATE METHODS OF DISPLAYING SEARCH RESULTS

FIELD OF THE INVENTION

The invention generally relates to search engines. More particularly, the invention relates to alternate methods of displaying search results.

BACKGROUND OF THE INVENTION

Conventional search engines can locate a wide range of articles on networks and individual client devices. Typically, conventional search engines display results in an HTML page within a web browser or within a custom search application program. Conventional systems do not provide adequate methods for displaying search results within existing user interfaces native to applications on a client or server device.

SUMMARY

Embodiments of the present invention comprise alternate methods of displaying search results. One exemplary embodiment comprises identifying a user interface native to a client application, identifying a search query, receiving a search result set responsive to the search query from a search application, wherein the search result set comprises a first article identifier associated with a first article and a second article identifier associated with a second article, the first article native to the client application and the second article not native to the client application, and displaying the search result set in the user interface.

This exemplary embodiment is mentioned not to limit or define the invention, but to provide an example of one embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention provide alternate methods for displaying search results. There are multiple embodiments of the present invention. By way of introduction and example, one exemplary embodiment of the present invention provides a method for integrating search results within an existing user interface native to an application on a client device. For example, one embodiment of the present invention allows internet and local search results to be displayed within the file open dialog box of a common client application, such as a graphics editing application, for example.

This introduction is given to introduce the reader to the general subject matter of the application. By no means is the invention limited to such subject matter. Exemplary embodiments are described below.

System Architecture

Figure 1:
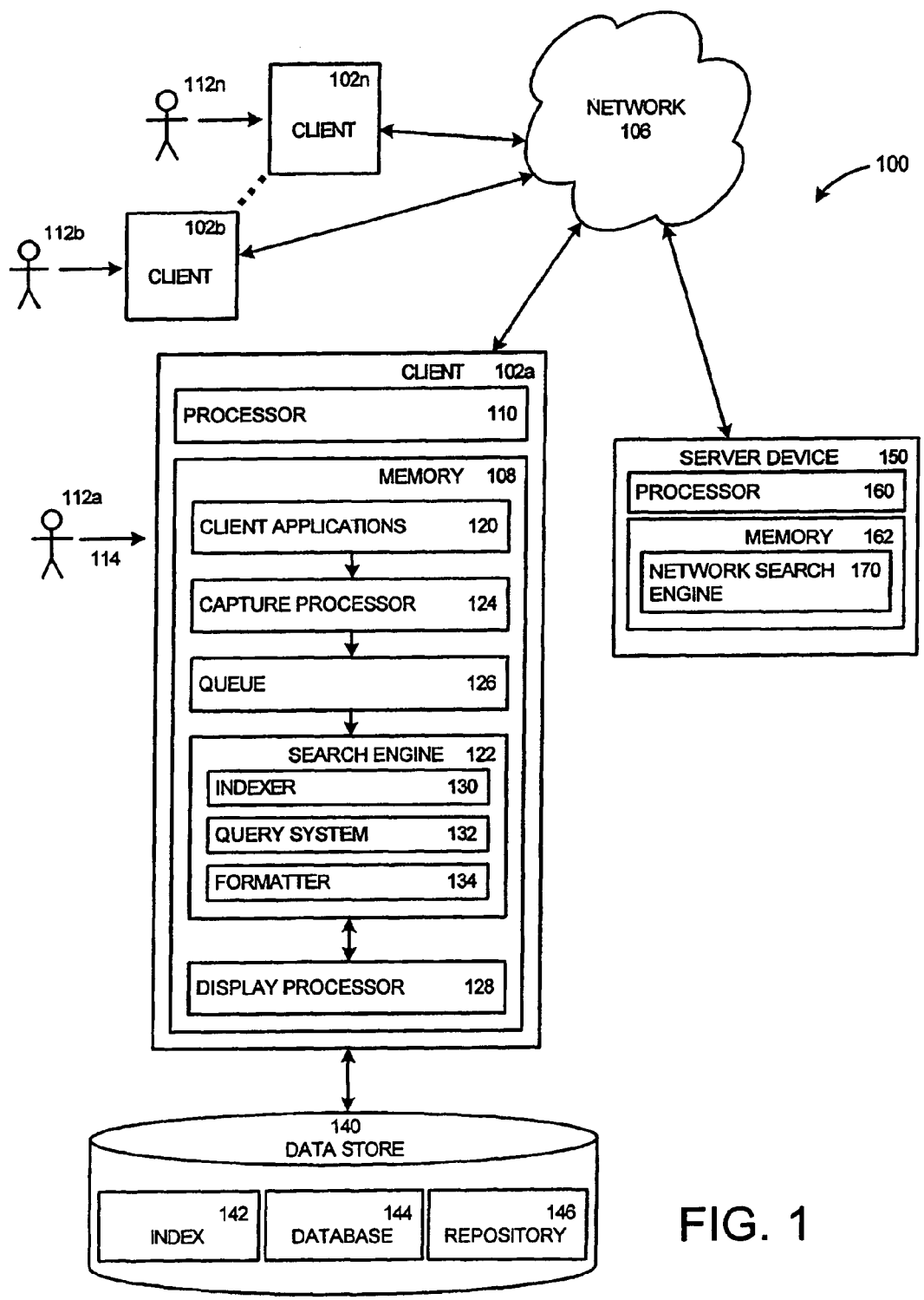
FIG. 1 is a diagram illustrating an exemplary environment in which one embodiment of the present invention may operate.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102*a-n* may also include a number of external or internal devices such as a mouse, a CD-ROM, DVD, a keyboard, a display device, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, the client devices 102*a-n* may be any type of processor-based platform that operates on any suitable operating system, such as Microsoft® Windows® or Linux, capable of supporting one or more client application programs. For example, the client device 102*a* can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102*a* that interacts with a remote e-mail server to access e-mail).

The user 112*a* can interact with the various client applications 120 and articles associated with the client applications 120 via various input and output devices of the client device 102*a*. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112*a* interaction with articles, the client applications 120, and the client device 102*a* creates event data that may be observed, recorded, analyzed or otherwise used. An event can be any occurrence possible associated with an article, client application 120, or client device 102*a*, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102*a* interacts with an article independent of the user 112*a*, such as when receiving an email or performing a scheduled task.

The memory 108 of the client device 102*a* can also contain a capture processor 124, a queue 126, and a search engine 122. The client device 102*a* can also contain or be in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112*a* or generate an implicit query and it can retrieve information from the data store 140 in response to the query. In another embodiment, the queue is located in the search engine 122. In still another embodiment, the client device 102*a* does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include accessing a user interface, opening a file open dialog box, viewing a web page, accessing bookmarks within a browser application, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the opening of a user interface by the user 112*a* can comprise, for example, a window handle for the user interface, a pair of window location coordinates, and a list of field types displayed in the interface.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprise a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102*a*. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for accessing a user interface can include a type of the interface, a type of associated parent application, a pair of display location coordinates for the interface, types of fields within the interface, types of controls within the interface, a window handle for the interface, and other suitable properties identifying information about the interface. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can identify a user interface being presented to the user 112a using an event schema for the interface. For example, the user 112a can be editing a text document within a word processing application on the client device 102a and desire to open a related document. The user 112a can then select a file open icon, for example, and the word processing application can display a file open dialog box to the user 112a. The capture processor 124 can identify that the file open dialog box is being presented to the user 112a and can identify information associated with the file open dialog box such as the types of fields it contains, whether it is currently active, display location coordinates, window handle information, parent application information, control information, and other suitable information describing the user interface.

The search engine 122 can also contain an indexer 130 and a query system 132. The query system 132 can retrieve events and performance data from the queue 126. The query system 132 can use performance data and events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, events are retrieved from the queue 126 by the indexer 130. Alternatively, the queue 126 may send the events to the indexer 130. The indexer 130 can index the events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. In one embodiment, the data store 140 can be in memory 108. The data store 140 may facilitate one or a combination of methods for storing data, including without limitation, arrays, hash tables, lists, and pairs, and may include compression and encryption. The data store can be one or more logical or physical storage areas. Other suitable methods and configurations of storing the events can also be used.

In the embodiment shown in FIG. 1, a user 112a can input an explicit query into an application interface displayed on the client device 102a, which is received by the search engine 122. The application interface can be any suitable interface displayed on the client device 102a. Embodiments of the present invention allow for user interfaces traditionally not used for entering search queries to receive search queries. For example, the capture processor 124 can receive an explicit query entered into the file open dialog box and pass the query to the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles which can be displayed within a user interface.

Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

According to one embodiment, a display processor 128 can be contained in memory 108 and can control the display of the result set on a display device associated with the client device 102a. The display processor 128 can be associated with a set of APIs to allow various applications to receive the results and display them in various formats, such as with user interfaces belonging to a parent application. For example, the display processor 128 can cause a result set to be displayed within a file open dialog box associated with a word processing application. According to other embodiments, other user interfaces can be used by the display processor to display search result sets. Embodiments of the present invention allow search result sets to be displayed in user interfaces not traditionally used for displaying search results. The display APIs can be implemented in various ways, including as, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

In one embodiment, the server device 150, or related device, has previously performed a crawl of the network 106 to locate articles, such as web pages, stored at other devices or systems coupled to the network 106, and indexed the articles in memory 162 or on another data storage device.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIG. 2-6.

Process

Various methods in accordance with the present invention may be carried out. For example, in one embodiment, a method comprises identifying a user interface native to a client application, identifying a search query, receiving a search result set responsive to the search query from a search application, wherein the search result set comprises a first article identifier associated with a first article and a second article identifier associated with a second article, the first article native to the client application and the second article not native to the client application, and displaying the search result set in the user interface.

According to another embodiment the search query can comprise an implicit or explicit query. According to another embodiment the user interface can be a folder view interface and the search result set can be displayed in a search results folder. In another embodiment, articles can be configured to be manipulated with a client application. Configuring articles to be manipulated by a client application can comprise converting the articles to a file type compatible with the client application or copying the articles. According to another embodiment the user interface can be an open dialog or a save dialog interface. According to another embodiment search results can be limited to files compatible with a client application. According to another embodiment a file can be converted to a file type compatible with a client application. According to another embodiment the user interface can be a link view interface or a bookmark view interface. According to another embodiment the search application can comprise a network search engine or a client search engine.

According to yet another embodiment, a method can comprise identifying a user interface native to a client application, identifying a search query, receiving a search result set responsive to the search query from a search application, wherein the search result set can comprise a first article identifier associated with a first article and a second article identifier associated with a second article, the first article comprising a client article and the second article comprising a network article, and displaying the search result set in the user interface. According to another embodiment the search result set can be limited to article identifiers associated with articles compatible with the client application. According to another embodiment the article can be configured to be compatible with a client application, which can include converting at least one of the first article and the second article to a file format compatible with the client application and copying at least one of the first article and the second article.

According to another embodiment, a method can comprise identifying a user interface native to a client application comprising native output items, identifying a library controlling output of the user interface, identifying a search query, identifying a search result set responsive to the search query, and accessing the library to cause the display of article identifiers associated with the search result set within the user interface, wherein the article identifiers are formatted to resemble the native output items. According to another embodiment, an amount of space available for displaying search results in the user interface can be identified and the result set can be formatted to fit the available space by one or more of causing the display of a scroll bar, causing the display of a droplist, and automatically scrolling the article identifiers in the result set.

According to yet another embodiment a method can comprise identifying a user interface native to a client application, identifying a search query, receiving a search result set responsive to the search query from a search application, wherein the search result set comprises at least one article identifier associated with an article responsive to the search query, and wherein the search application searches at least one article native to the client application and at least one article not native to the client application, and displaying the search result set in the user interface. In another embodiment, a method can comprise identifying an open dialog interface native to a client application, identifying a search query, receiving a search result set responsive to the search query from a search application, and displaying the search result set in the user interface.

Figure 2:
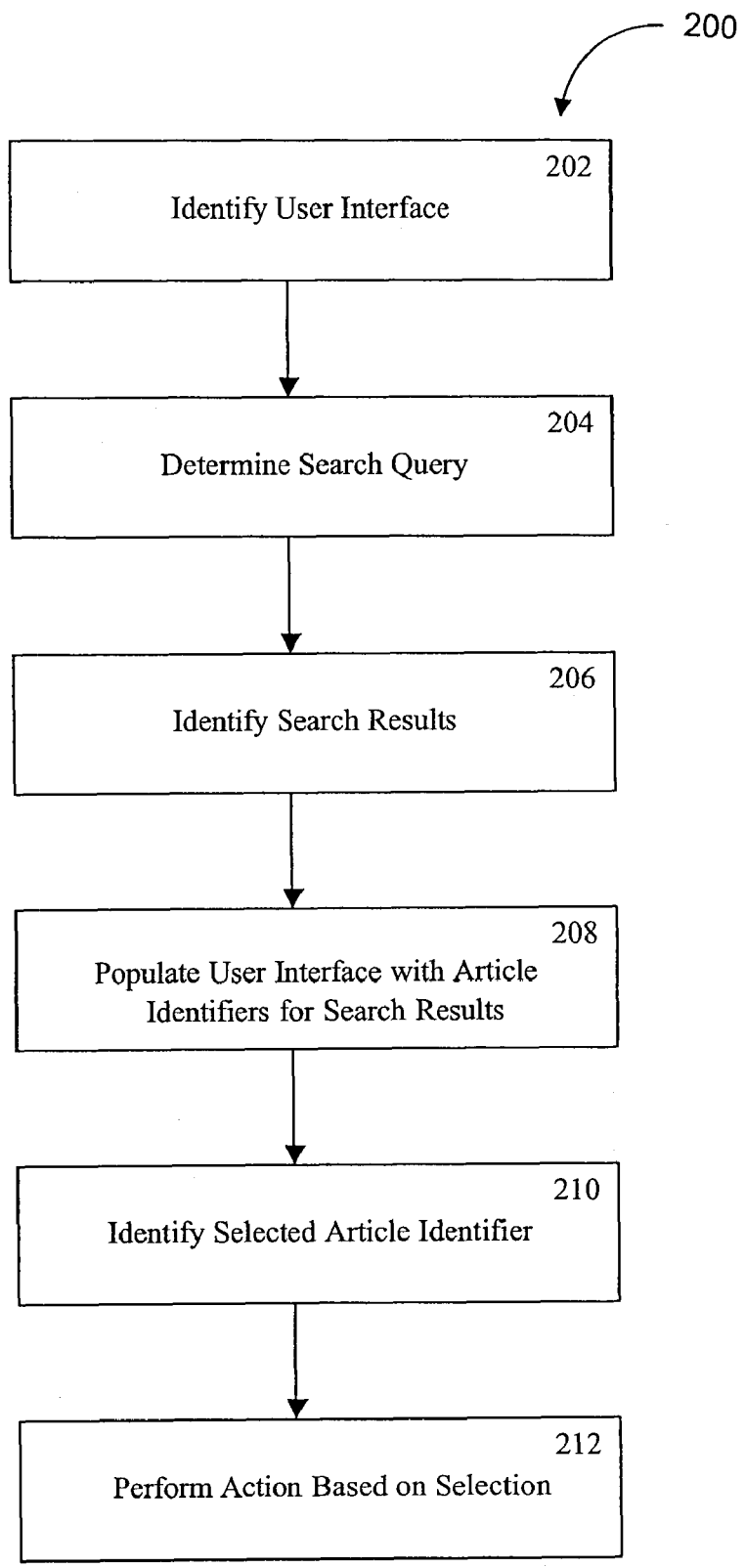
FIG. 2 is a flow diagram illustrating an exemplary method according to one embodiment of the present invention.
Figure 3:
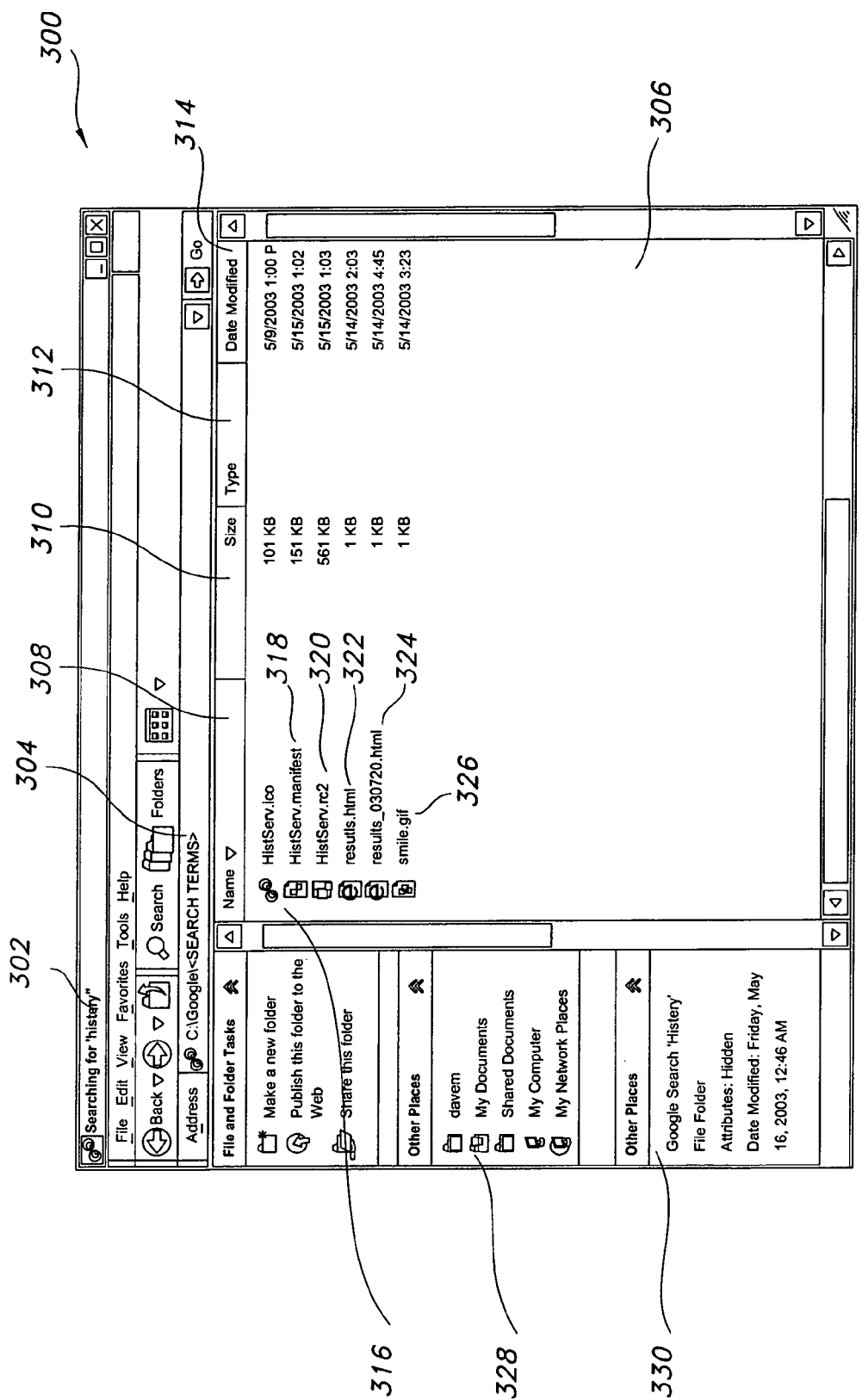
FIG. 3 is an illustration of an exemplary user interface according to one embodiment of the present invention.
Figure 4:
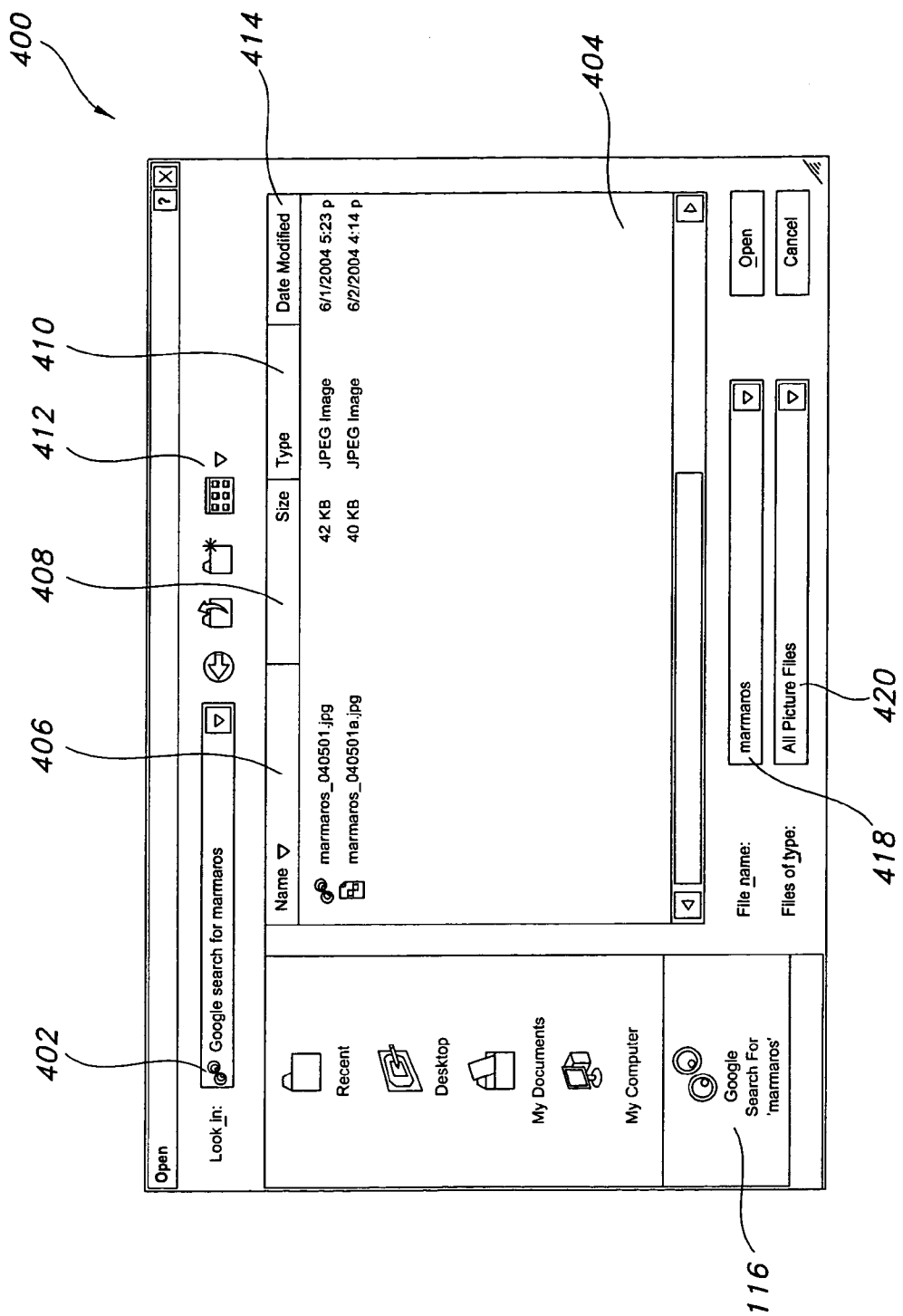
FIG. 4 is an illustration of another exemplary user interface according to one embodiment of the present invention.

FIG. 2 illustrates an exemplary method 200 that provides a method for displaying search results in a user interface native to a client application. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

The method 200 begins in block 202, wherein the capture processor 124 identifies a user interface. Identifying a user interface can comprise, for example, receiving information sent to the capture processor 124 about the user interface, or requesting information, such as by issuing an API call with a window handle corresponding to a window receiving input from the user 112a. For example, the user 112a can be working in a word processing document and desire to open a second document. The user 112a can select a file open option within the program and be presented with a file open dialog box. The capture processor 124 can identify that the user interface being presented to the user 112a is a file open dialog box by identifying, for example, the window handle of the active window, in this case the file open dialog box, and issuing an API call with the window handle to determine information about the type of window being displayed. For example, the capture processor 124 can determine what fields the dialog box contains, what regions within the box are available for displaying text, how much screen area is available for the dialog box, and other suitable parameters impacting the display of the dialog box.

In block 202, the capture processor 124 can identify any suitable type of user interface, including, for example, a user interface native to a client application such as a folder view interface, open or save dialog interface, link view interface, or bookmark view interface. A folder view interface can comprise an interface similar to the exemplary folder view interface 300 illustrated in FIG. 3. The exemplary folder view interface 300 illustrated in FIG. 3 comprises a title bar 302, an address bar 304, a content display area 306, column headings 308-314, search results 316-326, folder icon 328, and a detail listing 330. The exemplary open dialog 400 illustrated in FIG. 4 comprises a file selection menu 402, a content display area 404, column headings 406-412, a view selection icon 414, a link icon 416, a file name box 418, and a file type box 420. The exemplary link view interface 500 illustrated in FIG. 5 comprises a search term 502, an address bar 504, and links 506-510. The exemplary bookmark interface 600 illustrated in FIG. 6 comprises a favorites list 602, an address bar 604, links 606, and search results 608-614. The user interfaces 300-600 are exemplary interfaces offered for purposes of illustration. The method 200 may identify and use other suitable user interfaces besides those illustrated in FIGS. 3-6.

Once the capture processor 124 identifies a user interface, the method 200 proceeds to block 204, wherein the capture processor determines a search query. Determining a search query can comprise, for example, formulating an implicit query based on activity of the user 112a, or receiving an explicit query from the user 112a. Formulating an implicit query can comprise, for example monitoring events on the client device 102a and generating queries based on the events. For example, the capture processor 124 can identify that the user 112a is typing text and can, for example, extract search queries based on portions of the text being typed. For example, if the user 112a is typing a text document and types the phrase "budget meeting," the capture processor 124 can extract a string comprising the phrase "budget meeting" from the text typed by the user 112a and can parse out the terms "budget" and "meeting" by identifying words within the string and can thus formulate a search query.

The capture processor 124 can also identify implicit search queries based on passed text typed by the user 112a, text surrounding a cursor or other input device, text currently being typed by the user, or other suitable events or signals indicating a possible search query. According to one embodiment, certain events can trigger an implicit search query. For example, the ranking processor 124 can monitor events generated by the user 112a and can generate search queries based on the monitored events upon the occurrence of triggering events. The triggering events can comprise, for example, pressing the enter key, moving or clicking a mouse, set time intervals, selecting a control element, or other suitable event.

For example, the ranking processor 124 can generate an implicit query based on previous text entered by the user 112, for example, every time the user 112 presses the enter key. Similarly, the ranking processor 124 can generate an implicit query whenever the user 112 click a mouse button or selects a control element. Selecting a control element can comprise, for example, clicking on a button, field, link, or other user interface element designed to initiate some action. Generating implicit queries at set time intervals can comprise creating an implicit query based on events spanning a certain period of time. For example, the ranking processor 124 can generate an implicit query every three seconds based on events occurring during the last minute. The time frames given here are only exemplary, other time frames can be used by the present invention.

The capture processor 124 can receive an explicit search query from the user 112a, for example, by identifying input into a user interface. For example, the capture processor 124 can monitor input into a particular field or portion of a user interface in order to formulate an explicit query. For example, the user 112a can access the file open dialog 400 and type a term or search string, such as a name "marmaros" for example, into the file name box 418. The capture processor 124 can identify this term as an explicit query. According to other embodiments, the capture processor 124 can identify explicit queries entered into other types of user interfaces. For example, the capture processor 124 can identify user input entered into the address bar 502 of the link view interface 500, the address bar 604 of bookmark view interface 600, the address bar 304 of the folder view interface 304, a search dialog box within a user interface, or other suitable input location within a user interface.

According to one embodiment, the search query can be received letter-by-letter or word-by-word. In a letter-by-letter method, a new search query can be identified with each update to the text field. According to such an embodiment, a search application configured to receive prefix or substring searches may be employed. In a word-by-word example, a query can be identified upon a suitable delineator such as a space, suitable pause, or identification of a complete word or other string existing in a lexicon associated with the search application.

Once the capture processor 124 determines a search query, the method 200 proceeds to block 206 wherein the search engine 122 identifies search results responsive to the search query. Identifying search results responsive to the search query can comprise, for example, identifying articles on the client device 102 or within the data store 140 containing terms associated with the query, submitting the search query to the search engine 170 on the server device 150, searching a combination of articles within the data store 140 and submitting the search query to the search engine 170, or other suitable method of obtaining search results responsive to the search query.

Once the search engine 122 identifies search results responsive to the search query, the method 200 proceeds to block 208, wherein the display processor 128 populates the user interface identified in block 202 with a result corresponding to the search results identified in block 206. Populating the user interface identified in block 202 can comprise, for example, integrating search result identifiers into display locations traditional used to display other information within the user interface.

For example, populating the folder view interface 300 can comprise, for example, causing search result identifiers to be displayed within the content display area 306. Traditionally, the content display area 306 for a typical folder view interface, displays output items such as contents of folders or directories within the client device 102a or data store 140. For example, typically the content display area 306 within the folder view interface 300 can display files located on the client device or network drive. In block 208, the display processor 128 can cause search result identifiers to be displayed within the display area 306 and cause the identifiers to appear as if they are within a search folder located on the client device, for example. The display processor 128 can cause the search result identifiers to appear within the display area 306 as if they are files on the client device by accessing a library controlling the output of the folder view interface 300, such as a dynamic link library for example, to instruct the operating system or application causing the display of the folder view interface 300 to display the search result identifiers obtained in block 206 as if they were files residing on the client device. Accessing a library can comprise accessing any suitable set of subprograms, program calls, or processes, controlling some feature of the application or of the interface within the application.

Additionally, the display processor 128 can display the results within the content display area 404 of the file open dialog interface 400. Typically a file open dialog interface displays files within a folder or section of a storage device that can be opened by a parent application causing the display of the open dialog interface. For example, a word processing application will typically display only text files that can be opened and edited by the word processing application. Typically there will also be a file type box 420, which can allow the user 112a to view additional file types. The display processor 128 can populate the content display area 404 of the open dialog interface 400 with search results and can limit the results displayed to types that can be used by the parent application causing the display of the open dialog interface 400 or to file types indicated in the file type box 420. According to one embodiment, file type information can be extracted from the file type box 420 and search results can be limited to results associated with the extracted file type information. For example, if the parent application is a graphics editing program, image file types such as .jpg, .bmp, and .gif, for example, can be extracted from the file type box 420 and the search query can include a limitation for only files matching these file type extensions.

According to other embodiments, file type information can be identified during block 202 when the capture processor 124 identifies information associated with the user interface or based on other suitable information from the capture processor 124 indicating the type of application with which a user is working on the client device 102a. For example, the capture processor 124 can identify a name of a process and determine, for example, that the process is associated with a text editing application and can display a list of files compatible with the text editing application. Determining file types compatible with an application can comprise accessing a database of file types stored on the client device 102a or available on the network 106.

Figure 5:
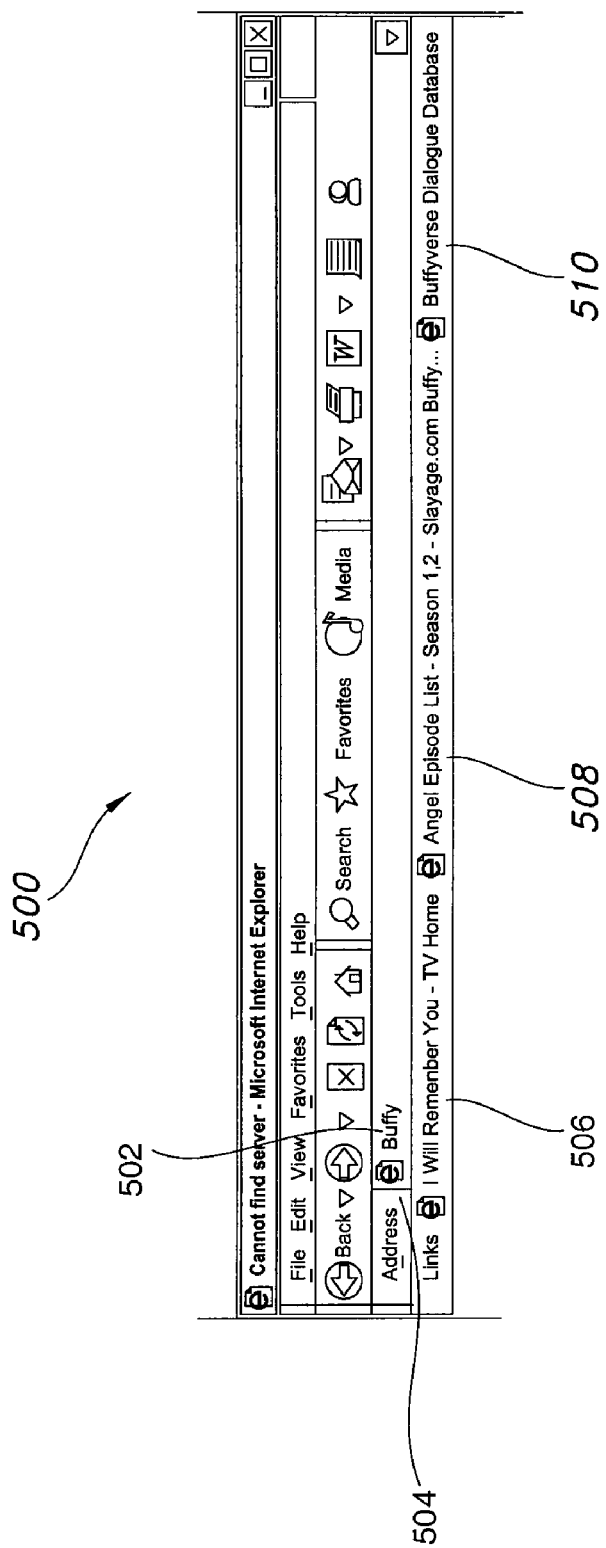
FIG. 5 is an illustration of another exemplary user interface according to one embodiment of the present invention.
Figure 6:
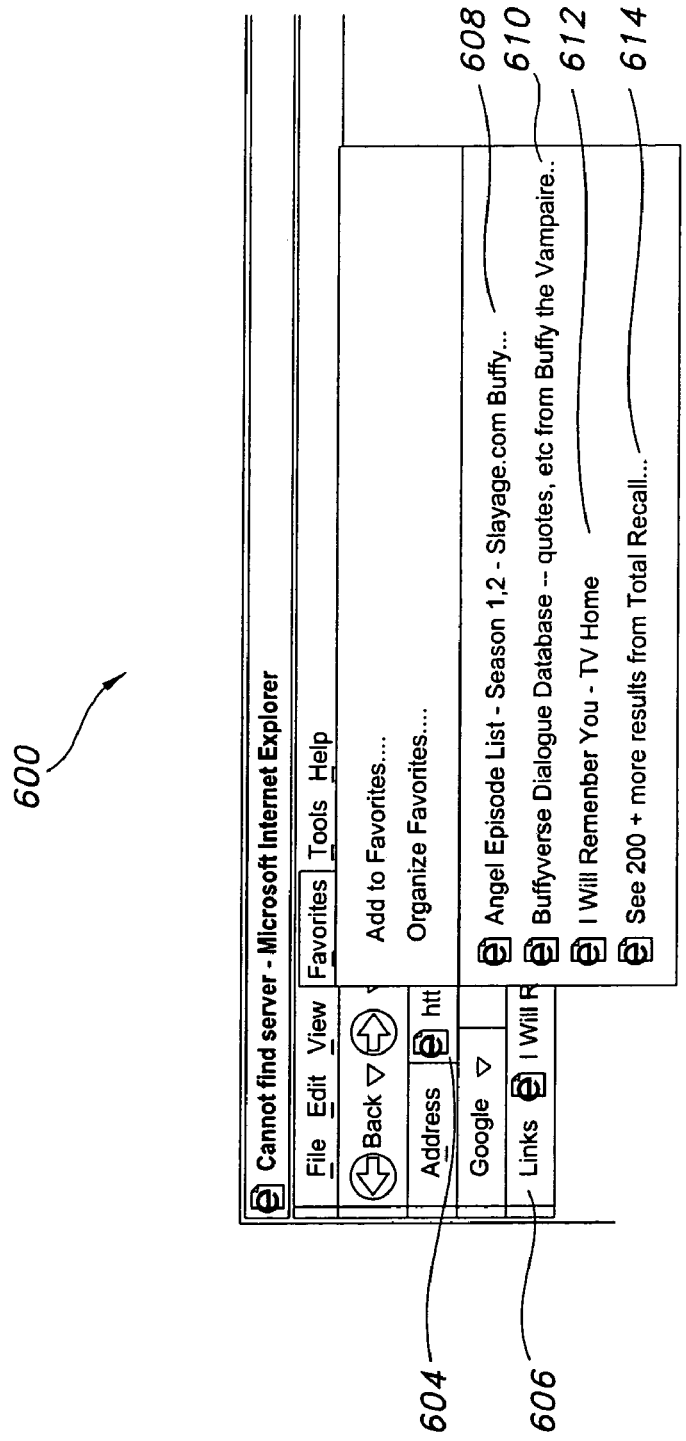
FIG. 6 is an illustration of another exemplary user interface according to one embodiment of the present invention.

According to another embodiment, the display processor 128 can populate the link view interface 500 with search results. Populating the link view interface 500 with search results can comprise displaying search results in a menu, such as links 506-510 for example. The text of the links 506-510 can comprise a portion of text from the search results selected to best represent the search result. Three links 506-510 are illustrated in FIG. 5 for purposes of example, but any number of links may be displayed. The dimensions of a toolbar portion of the link view interface 500 can be changed to accommodate more search results. For example, the user 112a can expand an area within the link view interface 500 for displaying links, or the display processor 128 can automatically scale the link view interface to accommodate more links.

According to another embodiment, the display processor 128 can display search results in a bookmark view interface 600. Display results in the bookmark view interface 600 can comprise, for example, populating a favorites list 602 with bookmarks 608-614, for example. The text of the bookmarks can comprise, for example, text extracted from a corresponding search result that is selected to best reflect the content of the search result. Additionally, in the bookmark view interface 600, or in any other user interface populated with search results, the search query, or other terms associated with the search result or search terms, can be displayed in the title bar of the user interface. For example, the title bar 302 of the folder view interface 302 can display the term "histserv" which comprises the search query generating the results displayed in the folder view interface 302. Thus where the title bar 302 typically displays the title for the user interface, the display processor 128 can cause the title bar to output the search query associated with the result set being displayed.

According to another embodiment, if a search query is not present or has not yet been generated, the display processor 128 can populate a user interface with articles determined to be of likely interest to the user 112a. Determining articles of likely interest to the user 112a can comprise, for example identifying recently edited documents, frequently accessed documents, or other suitable criteria for identifying document of likely interest to the user 112a. According to another embodiment, the display processor 128 can determine a number or results that can be displayed in an interface based on available space and can format the result set accordingly. Formatting the result set based on available space can comprise, for example, causing the display of a scroll bar or droplist, automatically scrolling the article identifiers in the result set, or other suitable method for displaying the result set in the available space.

Once the display processor 128 populates a user interface with the search results, the method 200 proceeds to block 210, wherein the display processor 128 identifies a selected or activated article identifier. Identifying a selected or activated article identifier can comprise, for example, determining on which article identifier the user 112a has clicked with a mouse or otherwise selected with an input device or over which article identifier a mouse pointer is hovering, for example.

Once a selected or activated article identifier is identified, the method 200 proceeds to block 212, wherein the display processor 128 performs an action based on the selected article identifier. Performing an action based on the selected article identifier can comprise, for example, causing the display of the search results corresponding to the article identifier, converting the search result to a format compatible with the parent application causing the display of the user interface, copying or mirroring the search result to the client device 102a for manipulation by the user 112a, or other suitable action. For example, the user 112a can be working in a word processing application and open a file open dialog box. The capture processor 124 can identify that the user 112a has accessed the file open dialog and can identify an explicit search query based, for example, on previous text typed by the user 112a. The search engine 122 can identify a result set responsive to the search query containing, for example, article identifiers for articles on the client device and on the network 106. The display processor 128 can then present the search result set in the open file dialog and the user 112a can select, for example, an article identifier for an article located on the network 106.

According to one embodiment, the display processor 128 can then mirror the article to the client device 102a, for example, and convert it to a file type usable by the word processing application and thus enable the user 112a to work with the article as if it originated on the client device 102a. The display processor 128 can further upload an article, for example an article edited by the user 112a can be uploaded back to an original location on the network 106 once the user 112a is finished editing the document.

CONCLUSION

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method performed on a client device, the method comprising:
   identifying an open dialog of a client application executing on the client device, wherein the open dialog is displayed responsive to actions in a parent window of the client application and comprises an open button causing a file selected in the open dialog to be opened and a cancel button causing the open dialog to close and control to return to the parent window;
   identifying a search query directed to a network search engine executing on a server device located remotely from the client device;
   receiving a search result set responsive to the search query from the network search engine, wherein the search result set comprises a first article identifier representing a first file storing a first article, and a second article identifier representing a second file storing a second article, the first article of a file format compatible with the client application and the second article of a file format not compatible with the client application;
   obtaining a window handle of the open dialog;
   identifying regions of the open dialog that are available for displaying text by issuing an application programming interface (API) call with the window handle as an argument; and
   displaying at least the first article identifier within one of the identified regions of the open dialog.

2. The method of claim 1, wherein the search query comprises an implicit search query.

3. The method of claim 1, wherein the search query comprises an explicit search query.

4. The method of claim 1, wherein a new search query is identified upon updating of the open dialog.

5. The method of claim 4, wherein updating of the open dialog comprises at least one of a letter-by-letter or a word-by-word search.

6. The method of claim 1, further comprising at least one of converting the second article to a file format compatible with the client application and copying at least one of the first article and the second article.

7. The method of claim 1, further comprising converting the second article to a file type compatible with the client application.

8. The method of claim 1, further comprising identifying an amount of available space for displaying the search result set in the open dialog and formatting the result set based at least in part on the amount of available space.

9. The method of claim 8, wherein formatting the result set based at least in part on the available space comprises one or more of causing the display of a scroll bar, causing the display of a droplist, and automatically scrolling the article identifiers in the result set.

10. A computer program product having a computer-readable storage medium containing program code executable on a client device, the code comprising:
    program code configured to identify an open dialog of a client application executing on the client device, wherein the open dialog is displayed responsive to actions in a parent window of the client application and comprises an open button causing a file selected in the open dialog to be opened and a cancel button causing the open dialog to close and control to return to the parent window;
    program code configured to identify a search query directed to a network search engine executing on a server device located remotely from the client device;
    program code configured to receive a search result set responsive to the search query from the network search engine, wherein the search result set comprises a first article identifier representing a first file storing a first article, and a second article identifier representing a second file storing a second article, the first article of a file format compatible with the client application and the second article of a file format not compatible with the client application;
    program code configured to obtain a window handle of the open dialog;
    program code configured to identify regions of the open dialog that are available for displaying text by issuing an application programming interface (API) call with the window handle as an argument; and
    program code configured to display at least the first article identifier within one of the identified regions of the open dialog.

11. The computer program product of claim 10, wherein the search query comprises an implicit search query.

12. The computer program product of claim 10, wherein the search query comprises an explicit search query.

13. The computer program product of claim 10, wherein a new search query is identified upon updating of the open dialog.

14. The computer program product of claim 13, wherein updating of the open dialog comprises at least one of a letter-by-letter or a word-by-word search.

15. The computer program product of claim 10, further comprising at least one of program code configured to convert at least one of the first article and the second article to a file format compatible with the client application and program code configured to copy at least one of the first article and the second article.

16. The computer program product of claim 10, further comprising program code for converting at least one of the first article and the second article to a file type compatible with the client application.

17. The computer program product of claim 10, further comprising program code for identifying an amount of available space for displaying the search result set in the open dialog and formatting the result set based at least in part on the amount of available space.

18. The computer program product of claim 17, wherein formatting the result set based at least in part on the available space comprises one or more of causing the display of a scroll bar, causing the display of a droplist, and automatically scrolling the article identifiers in the result set.

19. The method of claim 1, wherein the first article is one of an email, a word processing document, instant messenger message, and a web page, and the second article is one of an email, a word processing document, instant messenger message, and a web page.

20. The method of claim 1, wherein:
    the open dialog further comprises a plurality of user input areas for specifying a file to open.

21. The method of claim 1, wherein the open dialog further comprises a file type list specifying a set of file formats, the method further comprising:
   receiving a selection of one of the file formats in the file type list; and
   displaying the second article identifier in the open dialog interface responsive to a file format of the second article being the file format of the received selection.

22. The method of claim 1, further comprising opening the first file responsive to receiving a selection of the open button.

23. The method of claim 1, wherein the identified search query is entered within the open dialog.

24. The method of claim 1, wherein each search result comprised by the search result set contains terms associated with the search query.

* * * * *